US010669942B2

(12) United States Patent
Stoia et al.

(10) Patent No.: US 10,669,942 B2
(45) Date of Patent: Jun. 2, 2020

(54) ENDCOVER ASSEMBLY FOR A COMBUSTOR

(71) Applicant: General Electric Company, Schenectady, NY (US)

(72) Inventors: Lucas John Stoia, Taylors, SC (US); Donald Mark Bailey, Simpsonville, SC (US); Elizabeth Leigh Exley, Greenville, SC (US); Heath Michael Ostebee, Easley, SC (US); Timothy James Purcell, Greenville, SC (US)

(73) Assignee: General Electric Company, Schenectady, NY (US)

( * ) Notice: Subject to any disclaimer, the term of this patent is extended or adjusted under 35 U.S.C. 154(b) by 615 days.

(21) Appl. No.: 15/440,561

(22) Filed: Feb. 23, 2017

(65) Prior Publication Data
US 2018/0238239 A1 Aug. 23, 2018

(51) Int. Cl.
*F23R 3/28* (2006.01)
*F02C 7/22* (2006.01)
*F23R 3/04* (2006.01)

(52) U.S. Cl.
CPC ............... *F02C 7/222* (2013.01); *F23R 3/04* (2013.01); *F23R 3/283* (2013.01); *F23R 3/286* (2013.01)

(58) Field of Classification Search
CPC .. F23R 3/283; F23R 3/286; F23R 3/10; F23R 3/54; F23D 14/62; F23D 14/64
See application file for complete search history.

(56) References Cited

U.S. PATENT DOCUMENTS

| 8,800,289 | B2 | 8/2014 | Johnson et al. |
| 9,151,503 | B2 | 10/2015 | Melton et al. |
| 9,163,839 | B2 | 10/2015 | Westmoreland et al. |
| 9,423,134 | B2 | 8/2016 | Woods et al. |
| 2013/0025285 | A1 | 1/2013 | Stewart et al. |
| 2013/0283798 | A1* | 10/2013 | Bellino .................... F23R 3/286 60/722 |
| 2014/0260271 | A1* | 9/2014 | Keener ..................... F23R 3/10 60/737 |

(Continued)

OTHER PUBLICATIONS

International Search Report and Written Opinion issued in connection with corresponding PCT Application No. PCT/US2018/018462 dated Apr. 24, 2018.

*Primary Examiner* — Gerald L Sung
*Assistant Examiner* — Rene D Ford
(74) *Attorney, Agent, or Firm* — Dority & Manning P.A.

(57) ABSTRACT

An endcover assembly for a combustor includes an endcover and a fuel nozzle rigidly connected to the endcover. The fuel nozzle includes a plurality of tubes that extends axially through a first plate, a fuel plenum and a second plate where each tube includes an inlet defined upstream of the first plate and an outlet disposed downstream from the second plate. The endcover assembly further includes an inlet flow conditioner having a forward end connected to the endcover and an aft end axially spaced from the forward end. The inlet flow conditioner circumferentially surrounds at least a portion of the fuel nozzle. A support plate is joined to the aft end of the inlet flow conditioner. Each tube of the fuel nozzle extends through a corresponding tube hole defined by the support plate. The fuel nozzle is connected to the support plate.

20 Claims, 4 Drawing Sheets

(56) References Cited

U.S. PATENT DOCUMENTS

| | | | |
|---|---|---|---|
| 2014/0311151 A1* | 10/2014 | Saito | F23R 3/42 |
| | | | 60/737 |
| 2014/0338354 A1 | 11/2014 | Stewart et al. | |
| 2015/0000284 A1 | 1/2015 | LeBegue et al. | |
| 2015/0000286 A1* | 1/2015 | LeBegue | F23R 3/28 |
| | | | 60/742 |
| 2015/0040579 A1 | 2/2015 | Melton | |

* cited by examiner

ENDCOVER ASSEMBLY FOR A COMBUSTOR

FIELD OF THE TECHNOLOGY

The present invention generally involves a combustor for a gas turbine. More specifically, the invention relates to an endcover assembly for a combustor.

BACKGROUND

During operation of a gas turbine engine, pressurized air from a compressor flows into a flow distribution plenum defined within the combustor. The pressurized air flows from the flow distribution plenum into an inlet to a corresponding premix passage of a respective fuel nozzle. Fuel is injected into the flow of pressurized air within the premix passage via one or more fuel nozzles. The fuel mixes with the pressurized air so as to provide a fuel and air mixture to a combustion zone or chamber defined downstream from the fuel nozzle(s).

In certain configurations, an upstream or forward end of each respective fuel nozzle is attached or mounted to a structural member such as an endcover or outer casing. A downstream or aft end of each respective nozzle is left unsupported. As such, the downstream end of each cantilevered fuel nozzle may vibrate as the combustor cycles through various operational conditions, thereby reducing high cycle fatigue design margins.

BRIEF DESCRIPTION OF THE TECHNOLOGY

Aspects and advantages are set forth below in the following description, or may be obvious from the description, or may be learned through practice.

One embodiment of the present disclosure is an endcover assembly for a combustor. The endcover assembly includes an endcover and a fuel nozzle rigidly connected to the endcover. The fuel nozzle includes a plurality of tubes that extends axially through a first plate, a fuel plenum and a second plate where each tube includes an inlet defined upstream of the first plate and an outlet disposed downstream from the second plate. The endcover assembly further includes an inlet flow conditioner having a forward end connected to the endcover and an aft end axially spaced from the forward end. The inlet flow conditioner circumferentially surrounds at least a portion of the fuel nozzle. A support plate is joined to the aft end of the inlet flow conditioner. Each tube of the fuel nozzle extends through a corresponding tube hole defined by the support plate and the fuel nozzle is connected to the support plate.

Another embodiment of the present disclosure is a combustor. The combustor includes an outer casing and an endcover assembly. The endcover assembly includes an endcover that is connected to the outer casing. The endcover and the outer casing at least partially define a high pressure plenum. A fuel nozzle is rigidly connected to the endcover. The fuel nozzle includes a plurality of tubes that extends axially through a first plate, a fuel plenum and a second plate of the fuel nozzle. Each tube includes an inlet defined upstream of the first plate and an outlet disposed downstream from the second plate. The endcover assembly further includes an inlet flow conditioner having a forward end that is connected to the endcover and an aft end that is axially spaced from the forward end. The inlet flow conditioner circumferentially surrounds at least a portion of the fuel nozzle. The endcover assembly also includes a support plate that is joined to the aft end of the inlet flow conditioner. Each tube of the fuel nozzle extends through a corresponding tube hole defined by the support plate, and the fuel nozzle is connected to the support plate.

Those of ordinary skill in the art will better appreciate the features and aspects of such embodiments, and others, upon review of the specification.

BRIEF DESCRIPTION OF THE DRAWINGS

A full and enabling disclosure of various embodiments, including the best mode thereof to one skilled in the art, is set forth more particularly in the remainder of the specification, including reference to the accompanying figures, in which.

DETAILED DESCRIPTION

Figure 1:
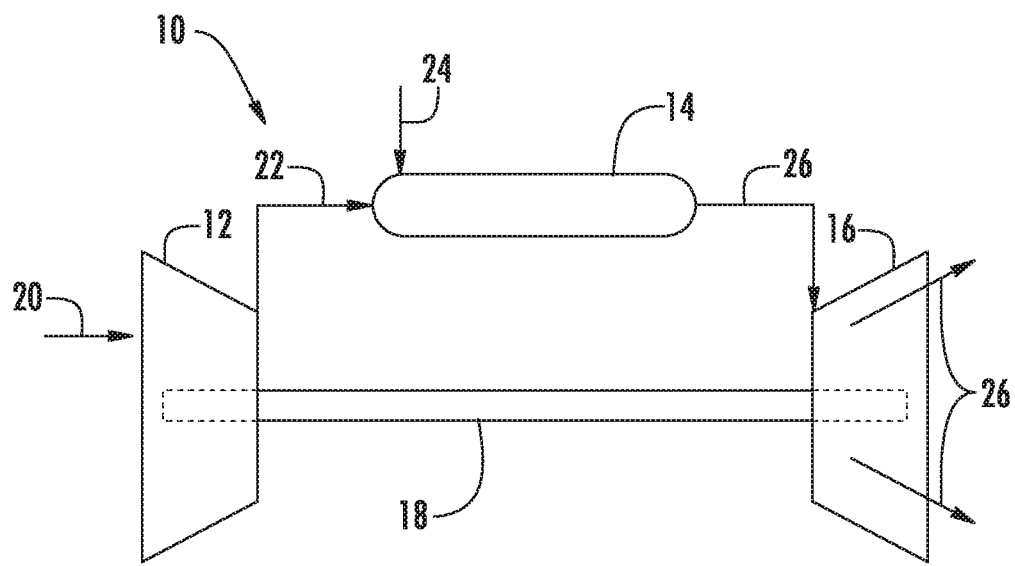
FIG. 1 is a functional block diagram of an exemplary gas turbine that may incorporate various embodiments of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component, and the term "circumferentially" refers to the relative direction that extends around the axial centerline of a particular component.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation, not limitation. In fact, it will be apparent to those skilled in the art that modifications and variations can be made without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents. Although exemplary embodiments of the present disclosure will be described generally in the context of a combustor for a land based power generating gas turbine for purposes of illustration, one of ordinary skill in the art will readily appreciate that embodiments of the present disclosure may be applied to any style or type of combustor for a turbomachine and are not limited to combustors or combustion systems for land based power generating gas turbines unless specifically recited in the claims.

Referring now to the drawings, FIG. 1 illustrates a schematic diagram of an exemplary gas turbine 10. The gas turbine 10 generally includes a compressor 12, at least one combustor 14 disposed downstream of the compressor 12 and a turbine 16 disposed downstream of the combustor 14. Additionally, the gas turbine 10 may include one or more shafts 18 that couple the compressor 12 to the turbine 16.

During operation, air 20 flows into the compressor 12 where the air 20 is progressively compressed, thus providing compressed or pressurized air 22 to the combustor 14. At least a portion of the compressed air 22 is mixed with a fuel 24 within the combustor 14 and burned to produce combustion gases 26. The combustion gases 26 flow from the combustor 14 into the turbine 16, wherein energy (kinetic and/or thermal) is transferred from the combustion gases 26 to rotor blades (not shown), thus causing shaft 18 to rotate. The mechanical rotational energy may then be used for various purposes such as to power the compressor 12 and/or to generate electricity. The combustion gases 26 may then be exhausted from the gas turbine 10.

Figure 2:
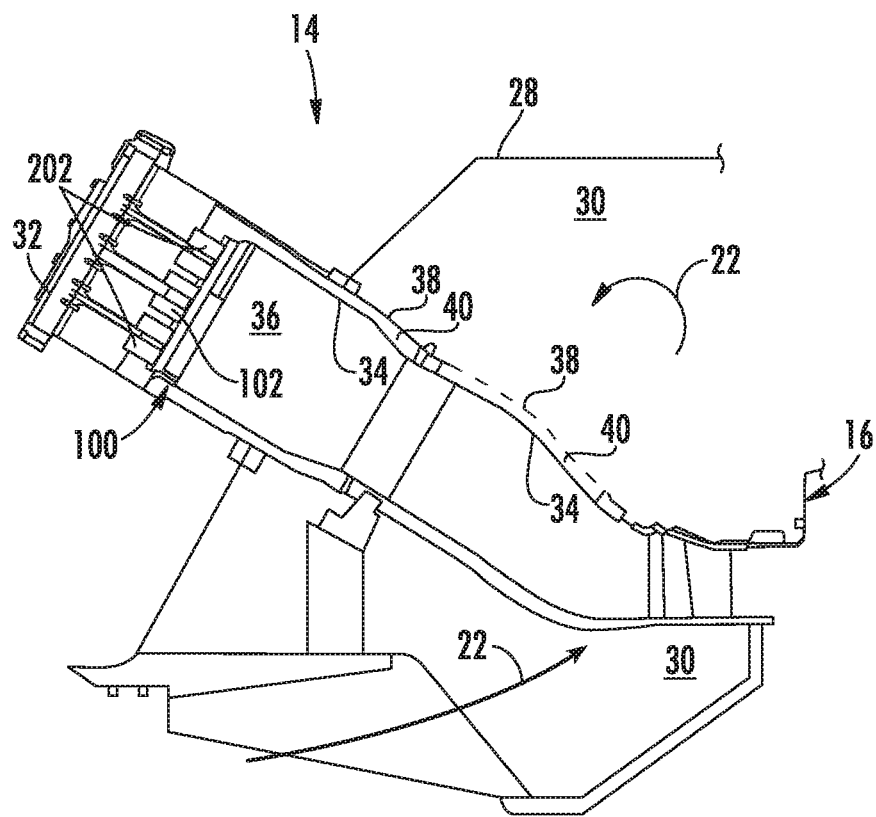
FIG. 2 is a simplified cross-section side view of an exemplary combustor as may incorporate various embodiments of the present disclosure.

As shown in FIG. 2, the combustor 14 may be at least partially surrounded by an outer casing 28 such as a compressor discharge casing. The outer casing 28 may at least partially define a high pressure plenum 30 that at least partially surrounds various components of the combustor 14. The high pressure plenum 30 may be in fluid communication with the compressor 12 (FIG. 1) so as to receive the compressed air 22 therefrom. An endcover 32 may be coupled to the outer casing 28. One or more combustion liners or ducts 34 may at least partially define a combustion chamber or zone 36 for combusting the fuel-air mixture and/or may at least partially define a hot gas path through the combustor 14 for directing the combustion gases 26 towards an inlet to the turbine 16.

In particular embodiments, the combustion liner 34 is at last partially circumferentially surrounded by a flow sleeve 38. The flow sleeve 38 may be formed as a single component or by multiple flow sleeve segments. The flow sleeve 38 is radially spaced from the combustion liner 34 so as to define a flow passage or annular flow passage 40 therebetween. The flow sleeve 38 may define a plurality of inlets or holes which provide for fluid communication between the annular flow passage 40 and the high pressure plenum 30.

Figure 3:
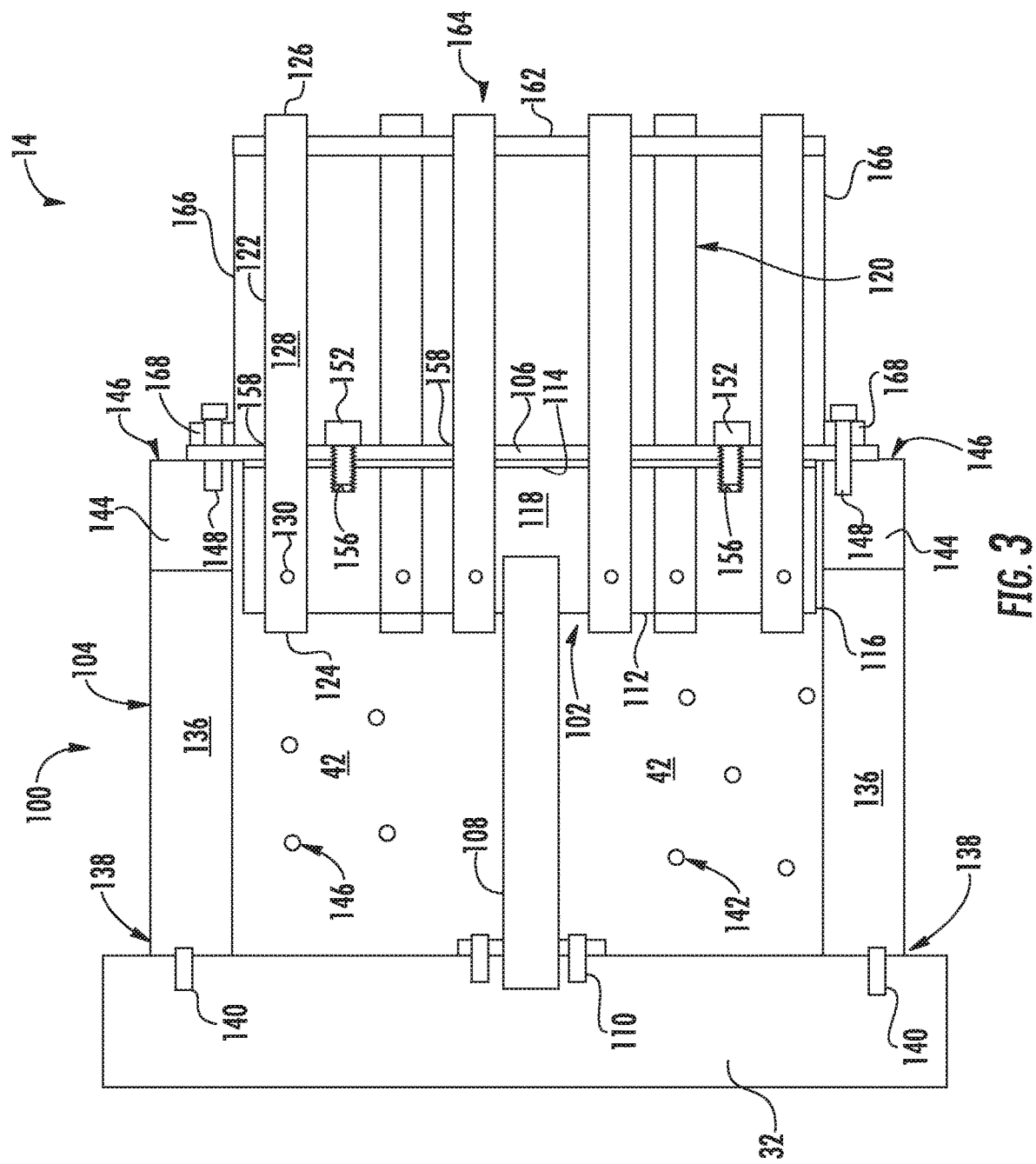
FIG. 3 is a cross-sectioned side view of a portion of the combustor as shown in FIG. 2, according to at least one embodiment of the present disclosure.

FIG. 3 provides a cross-sectioned side view of a portion of the combustor 14 as shown in FIG. 2, according to at least one embodiment of the present disclosure. In various embodiments, as shown in FIGS. 2 and 3 collectively, the combustor 14 includes an endcover assembly 100. In various embodiments, as shown in FIG. 3, the endcover assembly 100 generally includes the endcover 32, at least one fuel nozzle 102 coupled to the endcover 32, an inlet flow conditioner 104 connected to the endcover 32 and at least partially surrounding the fuel nozzle(s) 102, and a support plate 106 coupled or rigidly connected to the inlet flow conditioner 104. The fuel nozzle 102 may be rigidly coupled to the endcover 32 via a fluid conduit 108 and/or one or more mechanical fasteners 110 such as a pins, bolts or the like.

In particular embodiments, the fuel nozzle 102 includes a first or forward plate 112, a second or aft plate 114 axially spaced from the first plate 112 and an outer band or sleeve 116 that extends axially between the first plate 112 and the second plate 114. In particular embodiments, the first plate 112, the second plate 114 and the outer sleeve 116 collectively may at least partially define a fuel plenum 118 within the fuel nozzle 102. The fluid conduit 108 may be fluidly coupled to a fuel supply (not shown) and to the first plate 112 to provide fuel to the fuel plenum 118.

A tube bundle 120 comprising a plurality of tubes 122 extends through the first plate 112, the fuel plenum 118 and the second plate 114. Each tube 122 of the tube bundle 120 defines or includes a respective inlet 124, an outlet 126 defined downstream from the inlet 124, and a respective premix flow passage 128. One or more of the tubes 122 includes a fuel port 130 that is in fluid communication with the fuel plenum 118 and with the respective premix flow passage 128.

Figure 4:
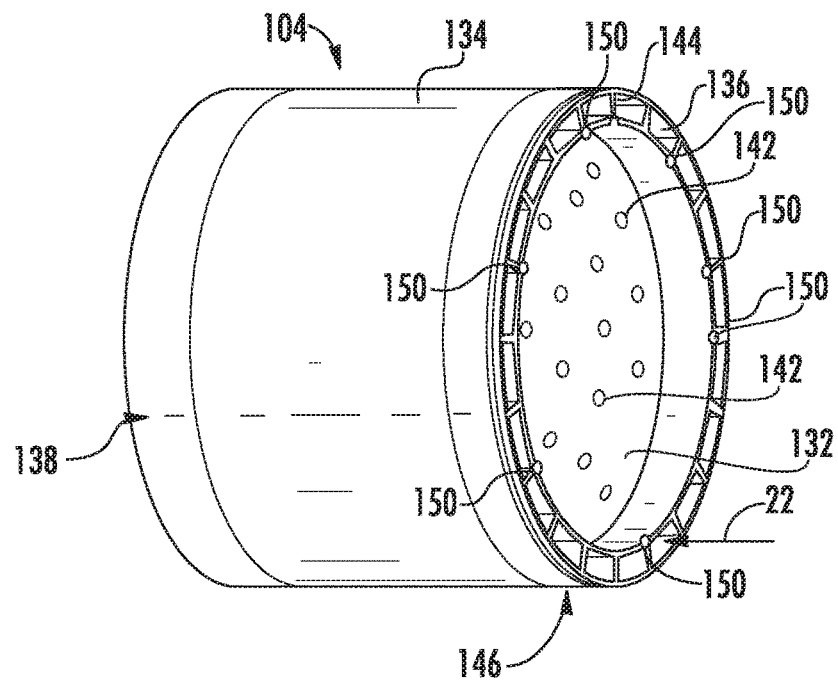
FIG. 4 is a perspective side view of an exemplary inlet flow conditioner as shown in FIG. 3, according to at least one embodiment.

FIG. 4 provides a perspective side view of an exemplary inlet flow conditioner 104 as shown in FIG. 3, according to at least one embodiment. In various embodiments, as shown collectively in FIGS. 3 and 4, the inlet flow conditioner 104 may include a first or inner sleeve 132 and a second or outer sleeve 134 that circumferentially surrounds the first sleeve 132. The second sleeve 134 is radially spaced from the first sleeve 132 so as to define an annular flow passage 136 therebetween. In particular embodiments, the first sleeve 132 may circumferentially surround at least a portion of the fuel nozzle 102 such that the plurality of tubes 122 extends axially outwardly from the inlet flow conditioner 104.

In particular embodiments, as shown in FIG. 3, a forward end 138 of the inlet flow conditioner 104 is rigidly connected to the endcover 32. For example, the forward end 138 of the inlet flow conditioner 104 may be fixedly connected to the endcover 32 via one or more mechanical fasteners 140 such as but not limited to pins, bolts or the like.

In particular embodiments, as shown in FIGS. 3 and 4 collectively, the first sleeve 132 may define a plurality of apertures or holes 142 circumferentially spaced about the first sleeve 132. The plurality of apertures 142 may be uniformly spaced or distributed or may be non-uniformly spaced or distributed along the first sleeve 132. In particular embodiments, as shown collectively in FIGS. 3 and 4, the inlet flow conditioner 104 may include a plurality of supports or guide vanes 144 that extend radially and axially between the first sleeve 132 and the second sleeve 134 proximate to an aft end 146 of the inlet flow conditioner 104. The aft end 146 of the inlet flow conditioner 104 is axially spaced with respect to a centerline of the inlet flow conditioner 104 and disposed downstream from the forward end 138 of the inlet flow conditioner 104. The supports 144 may be at least partially disposed within the annular flow passage 136 upstream from the apertures 142.

In particular embodiments, as show in FIG. 3, the first sleeve 132 and the endcover 32 may at least partially define a head-end volume or flow distribution plenum 42. The annular flow passage 136 and the plurality of apertures 142 provide for fluid flow between the high pressure plenum 30 (FIG. 2) and the flow distribution plenum 42. The first sleeve 132 circumferentially surrounds a at least a portion of the fuel nozzle 102 and the fluid conduit(s) 108. Each inlet 124 of each tube 122 is disposed within the first sleeve 132 and is in fluid communication with the flow distribution plenum 42.

In various embodiments, as shown in FIG. 3, the support plate 106 is coupled or connected directly to the inlet flow conditioner 104 and positioned downstream from the second plate 114 of the fuel nozzle 102. The support plate 106 may be connected to or joined with the inlet flow conditioner 104 via a plurality of mechanical fasteners 148 such as pins, bolts, screws or the like. In particular embodiments, as shown in FIG. 4, a plurality of fastener holes 150 is annularly arranged about the aft end 146 of the inlet flow conditioner 104. Each fastener hole 150 may be threaded or otherwise formed to receive a respective mechanical fastener 148. In particular embodiments, the support plate 106 may be fixedly connected to the inlet flow conditioner 104 via welding. In particular embodiments, the support plate 106 and the inlet flow conditioner 104 may be formed as a singular body.

Figure 5:
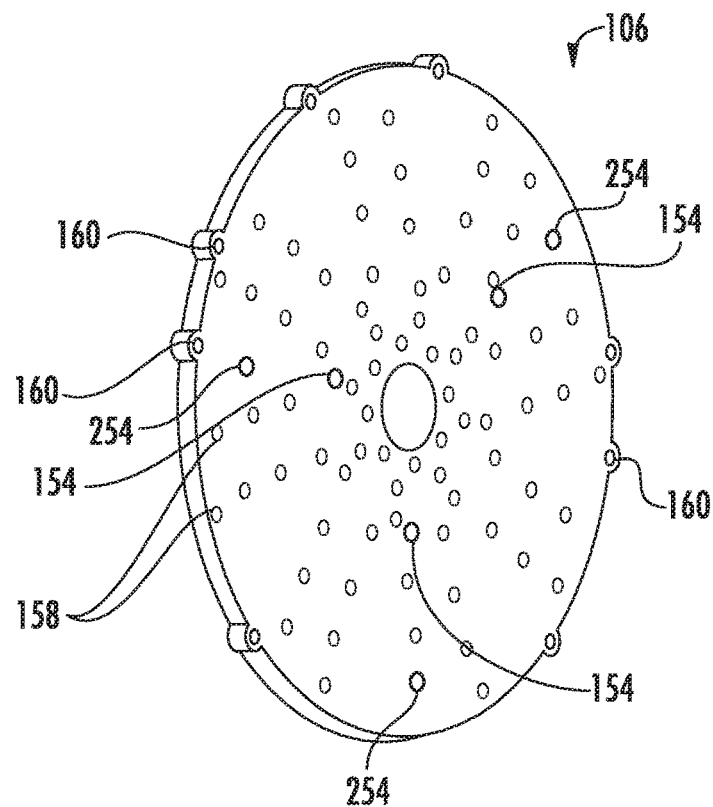
FIG. 5 is a perspective view of an exemplary support plate according to at least one embodiment of the present disclosure.

FIG. 5 provides a perspective view of an exemplary support plate 106 according to at least one embodiment of the present disclosure. In various embodiments, as shown in FIGS. 3 and 5 collectively, the fuel nozzle 102 is connected to the support plate 106 via at least one bolt or fastener 152. For example, in particular embodiments, the fasteners 152 extend through respective holes 154 (FIG. 5) defined in the support plate 106 and into a corresponding boss 156 (FIG. 3) disposed along the aft plate 114 of the fuel nozzle 102. Each boss 156 may be threaded or may include a threaded insert (not shown). By fastening the fuel nozzle 102 to the support plate 106, the fuel nozzle is constrained at two axial locations, thereby reducing stress at the end cover connection.

In particular embodiments, as shown in FIG. 5, the support plate 106 may be round. However, the particular shape of the support plate 106 is not limited to any particular shape unless otherwise recited in the claims. As shown in FIG. 5, the support plate 106 defines a plurality of tube holes 158 distributed radially and circumferentially across the support plate 106 such that each respective tube hole 158 coaxially aligns or substantially coaxially aligns with a corresponding tube 122 of the plurality of tubes 122 (FIG. 3) of the fuel nozzle 102. As shown in FIG. 3, each tube 122 of the plurality of tubes 122 extends through a corresponding tube hole 158 of the support plate 106.

In particular embodiments, as shown in FIG. 5, the support plate 106 defines or includes a plurality of mounting holes 160 circumferentially spaced and arranged along an outer perimeter of the support plate 106. Each respective mounting hole 160 may be aligned with a corresponding fastener hole 150 (FIG. 4) of the inlet flow conditioner 104. In this manner, a respective mechanical fastener 148 (FIG. 3) may extend through a respective mounting hole 160 and into a respective fastener hole 150 so as to secure or rigidly connect the support plate 106 to the inlet flow conditioner 104.

In particular embodiments, as shown in FIG. 3, an end or cap plate 162 may be disposed downstream from the support plate 106. In this configuration, a downstream end 164 of each tube 122 extends through and downstream from the cap plate 162. The cap plate 162 may provide thermal shielding from the combustion gases 26 burning in the combustion chamber 36. As shown in FIG. 3, a cap barrel or outer sleeve 166 may extend axially between the support plate 106 and the cap plate 162 and circumferentially surround a portion of each tube 122 of the plurality of tubes 120. The cap plate 162 may be fixedly connected to the cap barrel 166. In particular embodiments, the fasteners 148 may extend through a flange portion 168 of the cap barrel 166 so as to secure the cap barrel 166 and the cap plate 162 to the inlet flow conditioner 104.

Figure 6:
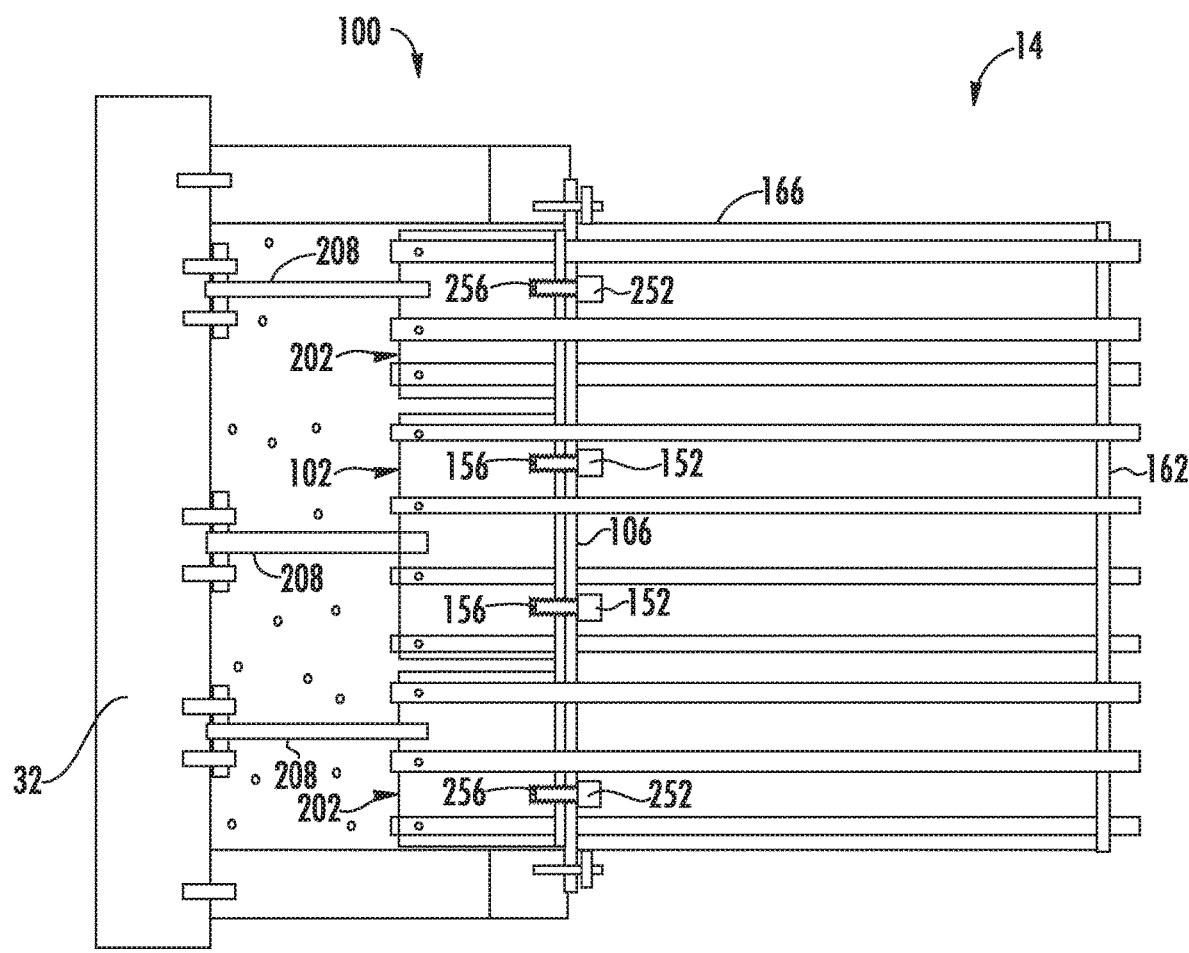
FIG. 6 is a cross-sectioned side view of a portion of the combustor as shown in FIG. 2, according to at least one embodiment of the present disclosure.

FIG. 6 is a cross-sectioned side view of a portion of the combustor 14 as shown in FIG. 2, according to at least one embodiment of the present disclosure. In particular embodiments, as shown in FIG. 6, the end cap assembly 100 includes a plurality of nozzle segments 202 configured similarly to fuel nozzle 102. The plurality of nozzle segments 202 is annularly arranged surround fuel nozzle 102. Each nozzle segment 202 may be connected to the end cover 32 via a respective fluid conduit 208. In this configuration, each nozzle segment 202 is also connected to the support plate 106 via a respective fastener 252 and a corresponding boss 256, thereby constraining each nozzle segment 202 in two axial locations and reducing stress at the end cover connection.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An endcover assembly for a combustor, the endcover assembly comprising:
    an endcover;
    a fuel nozzle rigidly connected to the endcover, the fuel nozzle including a plurality of tubes that extends axially through a first plate, a fuel plenum and a second plate of the fuel nozzle, where each tube includes an inlet defined upstream of the first plate and an outlet disposed downstream from the second plate;
    an inlet flow conditioner having a forward end connected to the endcover and an aft end axially spaced from the forward end, the inlet flow conditioner circumferentially surrounding at least a portion of the fuel nozzle, the inlet flow conditioner including a first sleeve circumferentially surrounded by a second sleeve, wherein the second sleeve is radially spaced from the first sleeve and defines an annular flow passage therebetween, wherein the first sleeve defines a first diameter; and
    a support plate joined to the aft end of the inlet flow conditioner, wherein each tube of the fuel nozzle extends through a corresponding tube hole defined by the support plate, and wherein the fuel nozzle is connected to the support plate, wherein the support plate defines a second diameter that is greater than the first diameter.

2. The endcover assembly as in claim 1, wherein the support plate defines a plurality of mounting holes and the inlet flow conditioner defines a plurality of fastener holes, wherein each mounting hole of the plurality of mounting holes is aligned with a respective fastener hole of the plurality of fastener holes.

3. The endcover assembly as in claim 1, further comprising an end plate disposed downstream from the support plate, wherein a downstream end of each tube of the plurality of tubes extends through the end plate.

4. The endcover assembly as in claim 1, wherein the first sleeve and the endcover define a flow distribution plenum upstream from the inlets of the tubes of the plurality of tubes.

5. The endcover assembly as in claim 1, wherein the first sleeve defines a plurality of apertures, wherein the plurality of apertures provide for fluid communication between the annular flow passage and a flow distribution plenum at least partially defined by the endcover and the first sleeve.

6. The endcover assembly as in claim 1, wherein the inlet flow conditioner further comprises a plurality of support vanes that extend radially between the first sleeve and the second sleeve.

7. The endcover assembly as in claim 6, wherein the plurality of support vanes is disposed proximate to an aft end of the inlet flow conditioner.

8. A combustor, comprising:
an outer casing;
an endcover assembly comprising: an endcover connected to the outer casing, wherein the endcover and the outer casing at least partially define a high pressure plenum;
a fuel nozzle rigidly connected to the endcover, the fuel nozzle including a plurality of tubes that extends axially through a first plate, a fuel plenum and a second plate of the fuel nozzle, where each tube includes an inlet defined upstream of the first plate and an outlet disposed downstream from the second plate;
an inlet flow conditioner having a forward end connected to the endcover and an aft end axially spaced from the forward end, the inlet flow conditioner circumferentially surrounding at least a portion of the fuel nozzle; and
a support plate connected directly to the second plate, extending radially past the second plate, and joined to the aft end of the inlet flow conditioner, wherein each tube of the fuel nozzle extends through a corresponding tube hole defined by the support plate, and wherein the fuel nozzle is connected to the support plate.

9. The combustor as in claim 8, wherein the support plate defines a plurality of mourning holes and the inlet flow conditioner defines a plurality of fastener holes, wherein each mounting hole of the plurality of mounting holes is aligned with a respective fastener hole of the plurality of fastener holes.

10. The combustor as in claim 8, further comprising an end plate disposed downstream from the support plate, wherein a downstream end of each tube of the plurality of tubes extends through the end plate.

11. The combustor as in claim 8, wherein the inlet flow conditioner includes a first sleeve circumferentially surrounded by a second sleeve, wherein the second sleeve is radially spaced from the first sleeve and defines an annular flow passage therebetween, wherein the annular flow passage is in fluid communication with the high pressure plenum.

12. The combustor as in claim 11, wherein the first sleeve and the endcover define a flow distribution plenum upstream from the inlets of the tubes of the plurality of tubes.

13. The combustor as in claim 11, wherein the first sleeve defines a plurality of apertures, wherein the plurality of apertures provide for fluid communication between the high pressure plenum, the annular flow passage and a flow distribution plenum at least partially defined by the endcover and the first sleeve.

14. The combustor as in claim 11, wherein the inlet flow conditioner further comprises a plurality of support vanes that extend radially between the first sleeve and the second sleeve within the annular flow passage.

15. The combustor as in claim 14, wherein the plurality of support vanes are disposed proximate to an aft end of the inlet flow conditioner.

16. An endcover assembly for a combustor, the endcover assembly comprising:
an endcover;
a fuel nozzle rigidly connected to the endcover, the fuel nozzle including a plurality of tubes that extends axially through a first plate, a fuel plenum and a second plate of the fuel nozzle, where each tube includes an inlet defined upstream of the first plate and an outlet disposed downstream from the second plate;
an inlet flow conditioner having a forward end connected to the endcover and an aft end axially spaced from the forward end, the aft end defining an aft surface, the aft surface extending radially with respect to a longitudinal axis of the fuel nozzle and including a plurality of fastener holes, the inlet flow conditioner circumferentially surrounding at least a portion of the fuel nozzle; and a support plate joined directly to the aft surface of the aft end of the inlet flow conditioner, wherein each tube of the fuel nozzle extends through a corresponding tube hole defined by the support plate, and wherein the fuel nozzle is connected to the support plate.

17. The endcover assembly as in claim 16, wherein the support plate defines a plurality of mounting holes and wherein each mounting hole of the plurality of mounting holes is aligned with a respective fastener hole of the plurality of fastener holes.

18. The endcover assembly as in claim 16, further comprising an end plate disposed downstream from the support plate, wherein a downstream end of each tube of the plurality of tubes extends through the end plate.

19. The endcover assembly as in claim 16, wherein the inlet flow conditioner includes a first sleeve circumferentially surrounded by a second sleeve, wherein the second sleeve is radially spaced from the first sleeve and defines an annular flow passage therebetween, wherein the annular flow passage is in fluid communication with the high pressure plenum.

20. The endcover assembly as in claim 19, wherein the first sleeve defines a plurality of apertures, wherein the plurality of apertures provide for fluid communication between the high pressure plenum, the annular flow passage and a flow distribution plenum at least partially defined by the endcover and the first sleeve.

* * * * *